United States Patent [19]

Merry et al.

[11] Patent Number: 4,700,045

[45] Date of Patent: Oct. 13, 1987

[54] SEAM TRACKING SYSTEM WITH ACOUSTO-OPTICAL SCANNER

[75] Inventors: J. Bradford Merry; Lawrence B. Brown, both of Annapolis, Md.

[73] Assignee: Chesapeake Laser Systems, Inc., Lanham, Md.

[21] Appl. No.: 729,121

[22] Filed: Apr. 30, 1985

[51] Int. Cl.$^4$ .................. B23K 26/02; B23K 26/08
[52] U.S. Cl. .................. 219/121 LU; 219/121 LW; 219/121 LX; 219/121 LZ
[58] Field of Search .................. 219/121 LC, 121 LD, 219/121 LW, 121 LU, 121 LV, 121 LX, 124.34

[56] References Cited

U.S. PATENT DOCUMENTS

| | | | |
|---|---|---|---|
| 3,135,857 | 6/1964 | Von Voros | 219/125 |
| 3,370,151 | 2/1968 | Normando | 219/131 |
| 3,757,125 | 9/1973 | Okada et al. | 250/202 |
| 4,218,142 | 8/1980 | Kryger et al. | 356/394 |
| 4,300,836 | 11/1981 | Holmes et al. | 356/376 |
| 4,328,416 | 5/1982 | Dudley et al. | 250/202 |
| 4,380,700 | 4/1983 | Kallen | 250/202 |
| 4,413,910 | 11/1983 | Cornu et al. | 219/124.34 X |
| 4,417,127 | 11/1983 | Nachev et al. | 219/124.34 |
| 4,427,880 | 1/1984 | Kanade et al. | 250/222.1 |

Primary Examiner—C. L. Albritton
Attorney, Agent, or Firm—Roylance, Abrams, Berdo & Goodman

[57] ABSTRACT

A system for tracking a random seam on a surface for the purposes of, for example, welding or inspecting the seam. The sensing assembly in the system comprises a laser and a scattered light detector. The beam from the laser is scanned across the seam via an acousto-optical deflector in the range of 170-2100 scans per second, thereby providing accurate tracking of the seam while allowing the system to move longitudinally along the seam in the range of 3.3 to 10 inches per second. The scanning width is reduced, or windowed, to decrease the amount of data received by the detector and the system's overall control system to allow the higher speeds in the range while maintaining the desired tracking accuracy by decreasing data processing time.

20 Claims, 2 Drawing Figures

SEAM TRACKING SYSTEM WITH ACOUSTO-OPTICAL SCANNER

The Government has rights in this invention Contract No. N00014-83-C-2226 awarded by the Department of Defense.

FIELD OF THE INVENTION

The invention relates to a system for tracking a random seam in a surface for the purposes of, for example, welding or inspecting the seam. The sensing assembly in the system comprises a laser and a scattered light detector. The beam from the laser is scanned across the seam via an acousto-optical deflector in an extremely rapid and precise manner, thereby providing accurate tracking while allowing the system to rapidly follow the length of the seam.

BACKGROUND OF THE INVENTION

Tracking devices used especially for welding random seams are known and usually utilize mirrors or television cameras to scan the seam and thus maintain the welding device over the seam. However, these devices suffer from significant drawbacks that limit their speed and accuracy. Cameras using CCD arrays or Vidicons have speed and resolution limitations. These limitations stem from the lack of random access of the information on the CCD array and the time required for sufficient exposure of the camera. Mechanically scanned mirrors have inertial constraints that also do not allow random access scanning. This failing frustrates the system designer's need to randomly move the scan in order to maximize exposure and minimize data collection time.

Thus, the number of scans across a seam during a specific period of time is limited. Accordingly, the accuracy of the seam tracking is likewise limited, thereby restricting the speed at which the welding machine can move longitudinally of the seam.

Examples of the known prior art relating to tracking systems and scanners are disclosed in the following U.S. Patents: U.S. Pat. No. 3,135,857 to Von Voros; U.S. Pat. No. 3,370,151 to Normando; U.S. Pat. No. 3,757,125 to Okada et al; U.S. Pat. No. 4,218,142 to Kryger et al; U.S. Pat. No. 4,300,836 to Holmes et al; U.S. Pat. No. 4,328,416 to Dudley et al; U.S. Pat. No. 4,380,700 to Kallen; U.S. Pat. No. 4,417,127 to Nachev et al; and U.S. Pat. No. 4,427,880 to Kanade et al.

SUMMARY OF THE INVENTION

Accordingly, a primary object of the invention is to provide a seam tracking system that has a high data collection rate to thereby assure a high control accuracy, while allowing a relatively fast movement longitudinally of the seam.

Another object of the invention is to provide a seam tracking system with an acousto-optical scanner that quickly and accurately modifies the position of the scanner transversely of the seam to follow the seam.

Another object of the invention is to provide a seam tracking system with an acousto-optical scanner that reduces the data from the scan by windowing the scan.

The foregoing objects are basically attained by providing a method of following a random seam on a surface comprising the steps of rigidly coupling a laser and a scattered light detector together, moving the laser and detector generally longitudinally of the seam while directing a beam from the laser generally towards the seam, repeatedly deflecting the beam generally transversely across the seam through a predetermined scanning width larger than the width of the seam via an acousto-optic deflector, detecting the light scattered from the surface and seam during each deflection of the beam across the seam via the scattered light detector and producing an output signal from the detector, repeatedly determining the location of the seam within the predetermined scanning width based on the output signal of the scattered light detector and producing a location signal corresponding to the location of the seam during each deflection, and moving the laser and detector generally transversely of the seam in response to each location signal to locate the seam at a predetermined position within the scanning width, to thereby follow the transverse deviation of the seam relative to the surface as the laser and detector move along the length of the seam.

The foregoing objects are also basically attained by providing an apparatus for following a random seam on a surface, the combination comprising: a laser; a scattered light detector; a first assembly for rigidly coupling the laser and detector together; a second assembly for directing a beam from the laser generally towards the seam; a third assembly, coupled to the laser and detector, for moving the laser and detector generally longitudinally of the seam; a fourth assembly, coupled to the laser and comprising an acousto-optic deflector, for repeatedly deflecting the beam from the laser generally transversely across the seam through a predetermined scanning width larger than the width of the seam; the second assembly including a mechanism for locating the detector relative to the laser, surface and seam, so as receive the light scattered from the surface and seam during each deflection of the beam across the seam, the detector producing an output signal representing such detected scattered light; a fifth assembly, coupled to the laser and detector, for moving the laser and detector generally transversely of the seam; and a control system, coupled to the fifth assembly and receiving the output signal, for (a) repeatedly determining the location of the seam within the predetermined scanning width based on the output signal of the detector, (b) producing a location signal corresponding to the location of the seam within the predetermined scanning width during each deflection, and (c) actuating the fifth means in response to the location signal to move the laser and detector generally transversely of the seam to locate the seam at a predetermined position within the scanning width, to thereby follow the transverse deviation of the seam relative to the surface as the laser and detector move along the length of the seam.

Other objects, advantages and salient features of the present invention will become apparent from the following detailed description, which, taken in conjunction with the annexed drawings, discloses a preferred embodiment of the invention.

DRAWINGS

Referring now to the drawings which form a part of this original disclosure:

FIG. 1 is a right perspective diagrammatic view of a seam tracking system utilizing an acousto-optical scanner in accordance with the invention, which view is not to scale; and FIG. 2 is an enlarged diagrammatic front elevational view of the apparatus shown in FIG. 1 but providing more detail, this view again not being to scale.

DETAILED DESCRIPTION OF THE INVENTION

Figure 1:
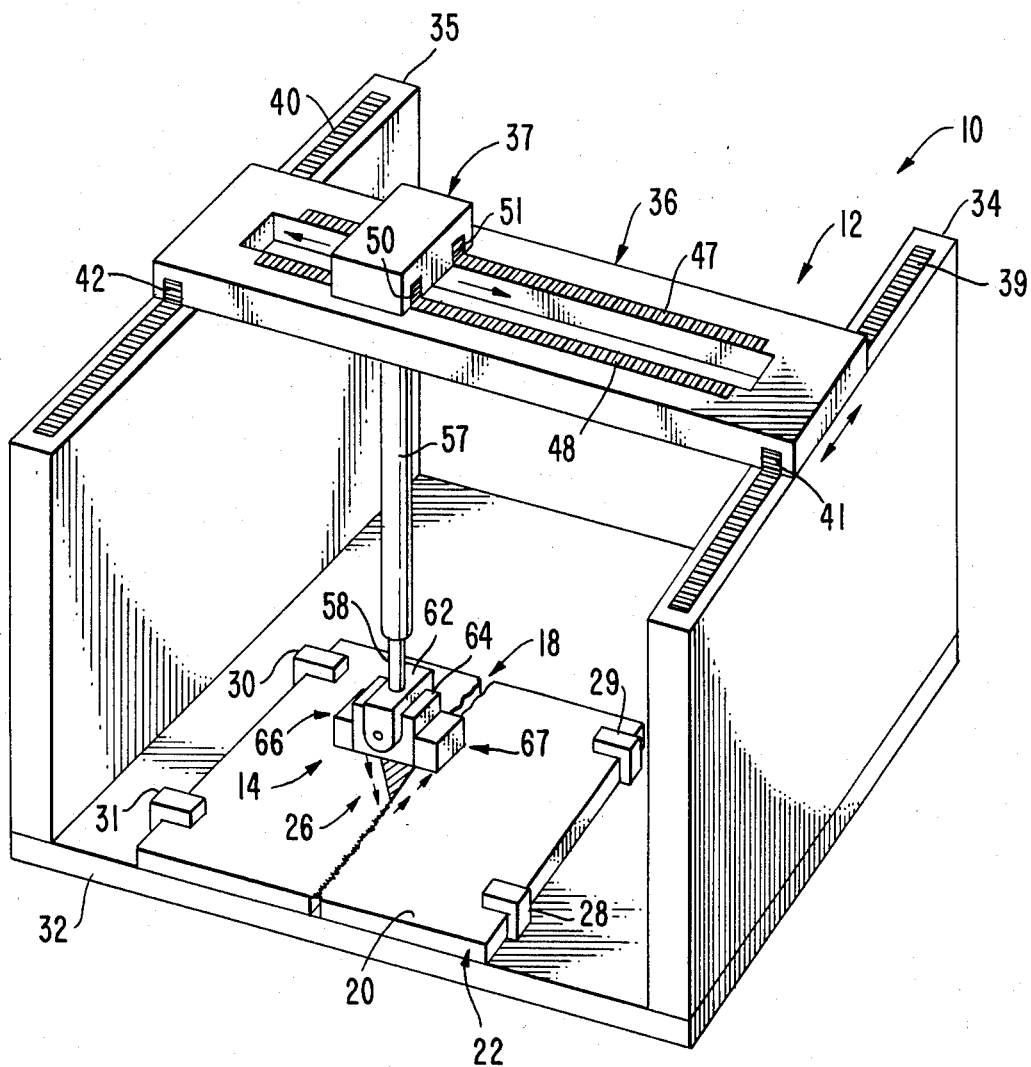
Figure 2:
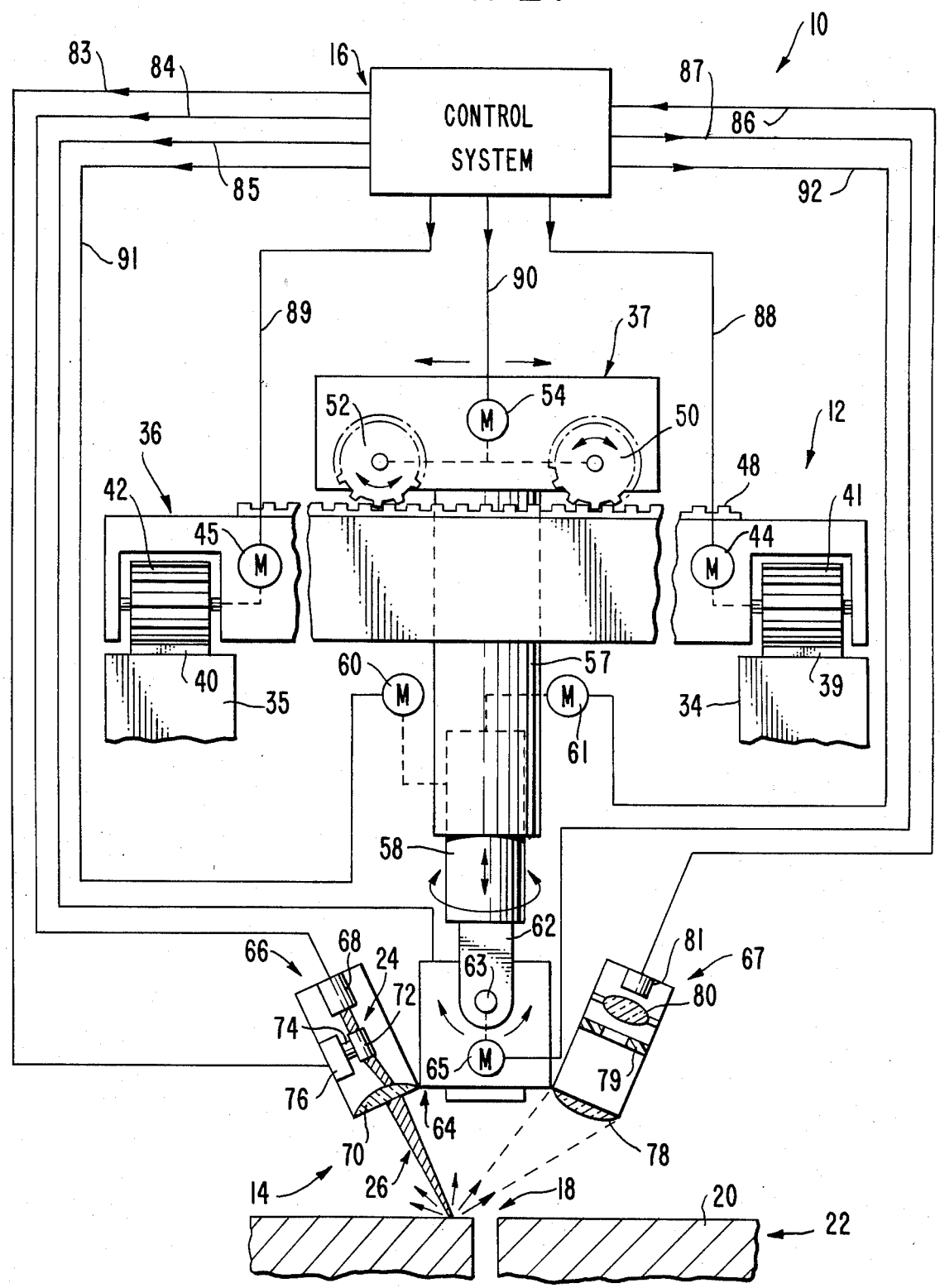

As seen in FIGS. 1 and 2, the seam tracking system 10 in accordance with the invention basically comprises a motive assembly 12, a sensing assembly 14, and a control system 16. As shown, tracking system 10 is intended to follow a random seam 18 in the surface 20 of a workpiece 22. As will be described in more detail hereinafter, the crux of the invention is utilizing an acousto-optic deflector 24 to scan a laser beam 26 across the seam very rapidly and precisely to provide numerous measurements per second and thereby provide a very accurate determination of the location of the seam relative to the tracking system. This allows the sensing assembly to move transversely of the seam at a high rate and thus accurately follow its random transverse deviation as the tracking system moves longitudinally of the seam.

One purpose of tracking such a seam in such a manner is to weld the seam, which will be described in more detail hereinafter. Another reason for following such a seam or random line is to direct an automatically guided vehicle.

As used herein, the term "seam" means an optically absorbing, scattering, or detectable feature such as a groove or a dark line in the surface of a workpiece or other structure.

Turning to FIG. 1, the workpiece 22 is shown rigidly coupled via four clamps 28–31 to a horizontal support 32. This horizontal support 32 can be the floor of a factory or any other substantially rigid feature or device. While the workpiece 22 is shown in FIG. 1 as a substantially planar piece of metal, it could be of any shape and in fact could be a road bed supported on the earth. The workpiece is also shown in FIG. 1 as being rigidly coupled to a support, which simplifies following of the seam. However, it is contemplated that the workpiece need not be rigidly connected to a support and the tracking system 10 could be supported in the air rather than to a specific support.

In all events, as shown in FIG. 1, the motive assembly 12 comprises a mechanism for moving the sensing assembly 14 longitudinally and transversely of the workpiece and comprises the horizontal support 32, a pair of spaced, parallel and vertically oriented walls 34 and 35, a transverse platform 36 supported on the top of the walls, and a carriage 37 which is movable longitudinally of the platform and thus transversely of the workpiece.

On the tops of walls 34 and 35 are a pair of parallel gear tracks 39 and 40. At the opposite ends of transverse platform 36 are four geared wheels, only wheels 41 and 42 being shown, which engage and move along the gear tracks 39 and 40. As seen in FIG. 2, bidirectional, direct current motors 44 and 45 actuate the geared wheels to move the transverse platform longitudinally of the walls and thus longitudinally of the workpiece 22.

On top of the transverse platform 36 are a pair of parallel gear tracks 47 and 48 which receive four geared wheels, only wheels 50–52 being shown, that support the carriage 37 and are rotatable therein. These wheels on the carriage are powered by bidirectional, direct current motor 54 carried by the carriage. Motor 54, which can be supplemented by additional motors if necessary or required, provides a coarse adjustment of the carriage transversely of the workpiece.

Formed completely through the transverse platform 36 is a slot 56 through which an arm 57 extends downwardly from the carriage 37. This arm has an extension 58 that is suitably and conventionally coupled thereto for rotation about a vertical axis and linear reciprocation along the vertical axis via bidirectional, direct current motors 60 and 61. These motors, which can be any suitable type and conventional, can raise or lower the sensing assembly 14 relative to the workpiece and also rotate it as necessary around the vertical axis.

Rigidly coupled to the end of extension 58 is a clevis 62 having a transverse shaft 63 thereon which is directed through a welding device housing 64 and pivotally couples the welding device housing to the arm for pivotal movement about a horizontal axis. Bidirectional, direct current motor 65 is suitably coupled to the clevis or housing and/or the shaft to provide such pivotal movement to the housing and is capable of 100 movements a second. This welding device can be any suitable welding mechanism and is preferably a lightweight laser guidance system using mirrors, weighing about two pounds or less, to direct a laser welding beam from the laser, which is located adjacent the system. The welding device can also be an electric arc torch.

The sensing assembly 14 as seen in FIGS. 1 and 2 comprises a scan assembly 66 and a detector assembly 67 which are rigidly coupled together by being suitably rigidly coupled to the welding device housing 64 and thereby movable therewith. Alternatively, the scan assembly and detector assembly can be suitably rigidly coupled together and the welding device housing can be separately coupled to the arm 57, although there would then be an additional mechanism to transfer transverse movement of the scan and detector assemblies to the welding device housing so that the welding device can follow the seam under the direction of movement of the scan and detector assemblies.

The scan assembly 66 comprises a suitable housing having supported therein a laser 68, the acousto-optic deflector 24, and a telecentric scan lens 70 which directs the laser beam 26 perpendicular thereto and towards the seam 18. The acousto-optic deflector can be of any conventional type and comprises a crystal 72 and a piezoelectric transducer 74 coupled to the crystal, and actuated by a voltage controlled radio frequency oscillator 76 coupled to the transducer via a matching electrical network. Advantageously, the crystal is formed from tellurium dioxide and the transducer is formed from lithium niobate, which results in the ability to very rapidly and precisely deflect the laser beam while being small and lightweight. The oscillator operates in the 50–150 megahertz range, and while shown in the scan assembly housing, can be located at a fixed position outside the housing adjacent the overall system.

As will be described in more detail hereinafter, the control system 16 is connected to the radio frequency oscillator and upon actuation, determines the deflection or scan width of the laser beam via the acousto-optical deflector 24. This scan width will be larger than the seam width and can be reduced in size, i.e., windowed, to decrease the amount of data to be handled by the control system.

As seen in FIG. 2, the detector assembly 67 includes a housing having an imaging lens 78 at the bottom, an aperture in the form of an elongated slit 79, a field lens 80 and a photodetector 81. The slit 79 is located in a vertical plane containing the plane of the deflected laser beam so as to reduce the amount of extraneous light entering the photodetector 81, which is intended to detect the light scattered from the workpiece surface and seam as the laser beam 26 is deflected or scanned across the seam.

The control system 16 comprises a conventional digital computer and receives input of data from the photodetector 81 and controls operation of the various motors, the welding device, the laser and the radio frequency oscillator.

In particular, the control system 16 is interconnected via line 83 with the radio frequency oscillator 76, via line 84 to the laser 68, and via line 85 to the welding device in the housing 64. The control system is also interconnected via line 86 with the photodetector 81 and with motor 65 via line 87. In a similar manner, the control system is connected to motors 44, 45 and 54 via lines 88, 89 and 90 and to motors 60 and 61 via lines 91 and 92.

OPERATION

In operation, without the use of windowing which will be described in detail hereinafter, the platform 36 and carriage 37 shown in FIGS. 1 and 2 are first positioned over the beginning of the seam 18, and the arm 57 supports the sensing assembly 14 substantially over the beginning of the seam. Shaft 63 supports the welding device housing and sensing assembly 14 and is positioned longitudinally of the seam. Then, the radio frequency oscillator 76 is actuated along with laser 68 to scan the laser beam 26 via the acousto-optical deflector through a scanning width across the seam, which width is wider than the seam. Advantageously, the oscillator is actuated so that the deflection takes place only in one direction, although it is possible to operate the deflection in both directions. The laser beam is then repeatedly deflected generally transversely across the seam through the predetermined scanning width until the detector sends signals to the control system 16 allowing the control system to recognize that a bona fide seam has been acquired. This may take approximately 100 deflections and allows the control system to rule out bogus seams in the form of scratches or dirt. Once the control system acquires the seam, motors 44 and 45 are actuated to move the platform and thus carriage 37, arm 57, and sensing assembly 14 longitudinally of the seam.

During this longitudinal movement, the laser beam 26 is repeatedly deflected across the seam 18, the light scattered from the surface and seam during each deflection is detected via the detector 81 and the detector produces an output signal via line 86 to the control system 16. The control system then repeatedly determines the location of the seam within the predetermined scanning width based on the output signal of the detector and produces a location signal corresponding to the location of the seam during each deflection. As a result, the laser and detector in the scan and detector assemblies 66 and 67 are moved generally transversely of the seam via fine control motor 65 in response to the location signal to locate the seam at a predetermined position within the scanning width, such predetermined position being, for example, the nominal center of the scanning width. Thus, the scan and detector assemblies 66 and 67 are moved transversely of the seam and follow its transverse deviation as the scan assembly and detector assembly move longitudinally along the length of the seam.

During such longitudinal and transverse movement, the welding device housing also moves longitudinally and transversely of the workpiece to thereby follow the seam and provide an accurate weld. If the fine control of motor 65 reaches a maximum transverse limit, then motor 54 is actuated to move the carriage transversely of the workpiece and seam with a concomitant actuation of motor 65 to readjust the angular position of the scan and detector assemblies more directly over the seam.

In order to turn off the system 10 at the end of the seam, the control system 16 can utilize three conditions, satisfaction of any one deactivating the system. These three conditions can be, for example, readings by the control system of multiple seams, no single seam acquired within a specific period of time or no scattered light being detected via the detector.

In order to reduce the amount of data received by the control system from the detector, the scan width during deflection can be reduced, or windowed. This is accomplished using the control system by dividing the scanning width into increments of, for example, 1–100, noting the location of the seam at increment x along the scale of 1–100, and then reducing the predetermined scanning width to a windowed scanning width beginning at x−a and ending at x+b, where a and b are less than 100. For example, "a" can be 1–10 on a scale of 1–100 and likewise "b" can be 1–10 on a scale of 1–100. Advantageously, "a" and "b" can be the same.

If, after the scanning width is initially windowed, the seam is no longer located in the window, then the window can be widened via the radio frequency oscillator and control system in 1% steps of the 1–100 scale until the seam is located within the newly widened window. Then, the window is reduced and the starting and ending points of the window are modified via actuation of motor 65 to position the seam at the predetermined location in the window, which can advantageously be the nominal center of the windowed scanning width.

With the system described above, advantageously a seam having a width of about 0.03 inch can be accurately tracked using a scan width of about 2.0 inches and a window of about 0.05 inch. The scan width can advantageously be broken down into 2,000 increments and thus a scale of 1–2,000 and the window can be of a width of about 50 increments. The radio frequency oscillator can be actuated to deflect the beam across the seam approximately 1,000 times per second and the control system can utilize about 5 measurements from the detector to use as data for actuating motor 65. Motor 65 can be of the type that can actuate about 100 times a second and thereby provide a very fine motor control to follow the seam. The weld seam can advantageously be about 0.03 to about 0.25 inch.

As seen by Chart 1 set forth below, the control accuracy, sensing rate and sensing accuracy of the subject invention utilizing the acousto-optical deflector with and without windowing are extremely high as compared to these values for the conventional camera or mirror systems and also allow for a weld speed 10 times or 30 times as great.

CHART 1

|  | Camera or Mirror Systems | | Acousto-Optical Deflector | | Acousto-Optical Deflector with Windowing | | |
|---|---|---|---|---|---|---|---|
| Weld Speed (in/sec) | 0.33 | 0.33 | 3.3 | 3.3 | 3.3 | 10 | 10 |
| Sensing Rate (scan/sec) | 17 | 70 | 170 | 340 | 700 | 510 | 2100 |
| Sensing | 0.004 | 0.001 | 0.004 | 0.0025 | 0.001 | 0.004 | 0.001 |

CHART 1-continued

| | Camera or Mirror Systems | | Acousto-Optical Deflector | | Acousto-Optical Deflector with Windowing | | |
|---|---|---|---|---|---|---|---|
| Accuracy (± inch) Control Accuracy (± inch) | 0.02 | 0.005 | 0.02 | 0.01 | 0.005 | 0.02 | 0.005 |

While an advantageous embodiment has been chosen to illustrate the invention, it will be understood by those skilled in the art that various changes and modifications can be made therein without departing from the scope of the invention as defined in the appended claims. For example, if the seam is periodically interrupted by pre-existing tack welds, two or more scan and detector assemblies can be used in series to avoid a false "no seam" reading by the detector.

What is claimed is:

1. A method of following a random seam on a surface comprising the steps of rigidly coupling a laser and a scattered light detector together, moving the laser and detector generally longitudinally of the seam, while directly a beam from the laser generally towards the seam, repeatedly deflecting the beam generally transversely across the seam through a predetermined scanning width larger than the width of the seam via acoustical energy, detecting the light scattered from the surface and seam during each deflection of the beam across the seam via the scattered light detector and producing an output signal from the detector, repeatedly determining the location of the seam within the predetermined scanning width based on the output signal of the scattered light detector and producing a location signal corresponding to the location of the seam during each deflection, and moving the laser and detector generally transversely of the seam in response to each location signal to locate the seam at a predetermined position within the scanning width, to thereby follow the transverse deviation of the seam relative to the surface as the laser and detector move along the length of the seam, some of the deflecting steps comprising the steps of dividing the scanning width into increments of 1–100, noting the location of the seam at increment a along the scale of 1–100, and reducing the predetermined scanning width to a windowed scanning width beginning at x−a and ending at x+b, where a and b are less than 100.

2. A method according to claim 1, and further comprising the step of increasing the windowed scanning width to include the seam therein if the next determining step fails to locate the seam within the windowed scanning width of x−a to x+b.

3. A method of following a random seam on a surface comprising the steps of rigidly coupling a laser and a scattered light detector together, moving the laser and detector generally longitudinally of the seam, while directing a beam from the laser generally towards the seam, repeatedly deflecting the beam generally transversely across the seam through a predetermined scanning width larger than the width of the seam via acoustical energy, detecting the light scattered from the surface and seam during each deflection of the beam across the seam via the scattered light detector and producing an output signal from the detector, repeatedly determining the location of the seam within the predetermined scanning width based on the output signal of the scattered light detector and producing a location signal corresponding to the location of the seam during each deflection, moving the laser and detector generally transversely of the seam in response to each location signal to locate the seam at a predetermined position within the scanning width, to thereby follow the transverse deviation of the seam relative to the surface as the laser and detector move along the length of the seam, detecting the end of the seam, and ceasing the two moving and the deflecting steps.

4. A method according to claim 1, and further comprising the steps of detecting the end of the seam, and ceasing the two moving and the deflecting steps.

5. A method according to claim 1, wherein a is in the range of 1 to 10, and b is in the range of 1 to 10.

6. A method of following a random seam on a surface comprising the step of rigidly coupling a laser and a scattered light detector together, moving the laser and detector generally longitudinally of the seam, while directing a beam from the laser generally towards the seam, repeatedly deflecting the beam generally transversely across the seam through a predetermined scanning width larger than the width of the seam via acoustical energy, detecting the light scattered from the surface and seam during each deflection of the beam across the seam via the scattered light detector and producing an output signal from the detector, repeatedly determining the location of the seam within the predetermined scanning width based on the output signal of the scattered light detector and producing a location signal corresponding to the location of the seam during each deflection, and moving the laser and detector generally transversely of the seam in response to each location signal to locate the seam at a predetermined position within the scanning width, to thereby follow the transverse deviation of the seam relative to the seam, the deflecting step being carried out at a rate of at least about 170 scans across the seam per second.

7. A method of following a random seam on a surface comprising the steps of rigidly coupling a laser and a scattered light detector together, moving the laser and detector generally longitudinally of the seam, while directing a beam from the laser generally towards the seam, repeatedly deflecting the beam generally transversely across the seam through a predetermined scanning width larger than the width of the seam via acoustical energy, detecting the light scattered from the surface and seam during each deflection of the beam across the seam via the scattered light detector and producing an output signal from the detector, repeatedly determining the location of the seam within the predetermined scanning width based on the output signal of the scattered light detector and producing a location signal corresponding to the location of the seam during each deflection, and moving the laser and detector generally transversely of the seam in response to each location signal to locate the seam at a predetermined position within the scanning width, to thereby follow the transverse deviation of the seam relative to the surface as the laser and detector move along the length of the seam, the deflecting step being carried out at a rate in the range of about 170 to about 2100 scans across the seam per second.

8. A method of following a random seam on a surface comprising the steps of rigidly coupling a laser and a scattered light detector together, moving the laser and detector generally longitudinally of the seam, while directing a beam from the laser generally towards the seam, repeatedly deflecting the beam generally transversely across the seam through a predetermined scanning width larger than the width of the seam via acoustical energy, detecting the light scattered from the surface and seam during each deflection of the beam across the seam via the scattered light detector and producing an output signal from the detector, repeatedly determining the location of the seam within the predetermined scanning width based on the output signal signal of the scattered light detector and producing a location signal corresponding to the location of the seam during each deflection, and moving the laser and detector generally tranversely of the seam in response to each location signal to locate the seam at a predetermined position within the scanning width, to thereby follow the transverse deviation of the seam relative to the surface as the laser and detector move along the length of the seam, the first moving step being carried out at a speed at least about 3.3 inches per second.

9. A method of following a random seam on a surface comprising the steps of rigidly coupling a laser and a scattered light detector together, moving the laser and detector generally longitudinally of the seam, while directing a beam from the laser generally towards the seam, repeatedly deflecting the beam generally transversely across the seam through a predetermined scanning width larger than the width of the seam via acoustical energy, detecting the light scattered from the surface and seam during each deflection of the beam across the seam via the scattered light detector and producing an output signal from the detector, repeatedly determining the location of the seam within the predetermined scanning width based on the output signal of the scattered light detector and producing a location signal corresponding to the location of the seam during each deflection, and moving the laser and detector generally transversely of the seam in response to each location signal to locate the seam at a predetermined position within the scanning width, to thereby follow the transverse deviation of the seam relative to the surface as the laser and detector move along the length of the seam, the first moving step being carried out at a speed in the range of about 3.3 to about 10 inches per second.

10. A method according to claim 9, wherein the deflecting step is carried out at a rate in the range of about 170 to about 2100 scans across the seam per second.

11. A method of following a random seam on a surface comprising the steps of rigidly coupling a laser and a scattered light detector together, moving the laser and detector generally longitudinally of the seam, while directing a beam from the laser generally towards the seam, repeatedly deflecting the beam generally transversely across the seam through a predetermined scanning width larger than the width of the seam via acoustical energy, detecting the light scattered from the surface and seam during each deflection of the beam across the seam via the scattered light detector and producing an output signal from the detector, repeatedly determining the location of the seam within the predetermined scanning width based on the output signal of the scattered light detector and producing a location signal corresponding to the location of the seam during each deflection, moving the laser and detector generally tranversely of the seam in response to each location signal to locate the seam at a predetermined position within the scanning width, to thereby follow the transverse deviation of the seam relative to the surface as the laser and detector move along the length of the seam, and welding the opposite sides of the seam together as the laser and detector move along the length of the seam.

12. A method according to claim 11, wherein the welding step includes the step of directing a welding laser beam at the seam.

13. An apparatus for following a random seam on a surface, the combination comprising:

a laser;

a scattered light detector;

first means for rigidly coupling said laser and detector together;

second means for directing a beam from said laser generally towards the seam;

third means, coupled to said laser and detector, for moving said laser and detector generally longitudinally of, the seam;

fourth means, coupled to said laser and comprising an acousto-optic deflector for repeatedly deflecting the beam from the laser generally transversely across the seam through a predetermined scanning width larger than the width of the seam;

said second means including means for locating said detector relative to said laser, surface and seam to receive the light scattered from the surface and seam during each deflection of the beam across the seam, said detector producing an output signal representing such detected scattered light;

fifth means, coupled to said laser and detector, for moving said laser and detector generally transversely of the seam; and control means, coupled to said fifth means and receiving said output signal, for
- (a) repeatedly determining the location of the seam within the predetermined scanning width based on the output signal of said detector,
- (b) producing a location signal corresponding to the location of the seam within the predetermined scanning width during each deflection, and
- (c) actuating said fifth means in response to said location signal to move said laser and detector generally transversely of the seam to locate the seam at a predetermined position within the scanning width, to thereby follow the transverse deviation of the seam relative to the surface as said laser and detector move along the length of the seam.

14. An apparatus according to claim 13, wherein said fourth means for deflecting includes means for deflecting the laser beam through at least about 170 scans across the seam per second.

15. An apparatus according to claim 13, wherein said fourth means for deflecting includes means for deflecting the laser beam through a range of about 170 to about 2100 scans across the seam per second.

16. An apparatus according to claim 13, wherein said third means for moving includes means for moving said laser and detector at least about 3.3 inches per 17. An apparatus according to claim 13, wherein said third means for moving includes means for moving said laser and detector in the range of about 3.3 to about 10 inches per second.

18. An apparatus according to claim 17, wherein said fourth means for deflecting includes means for deflecting the laser beam through a range of about 170 to about 2100 scans across the seam per second.

19. An apparatus according to claim 13, wherein said acousto-optical deflector includes a tellurium dioxide crystal.

20. An apparatus according to claim 13, wherein said acousto-optical deflector includes a piezoelectric transducer comprising lithium niobate.

* * * * *

UNITED STATES PATENT AND TRADEMARK OFFICE
CERTIFICATE OF CORRECTION

PATENT NO. : 4,700,045

DATED : October 13, 1987

INVENTOR(S) : J. Bradford Merry and Lawrence B. Brown

It is certified that error appears in the above—identified patent and that said Letters Patent is hereby corrected as shown below:

Column 1, line 5, after "invention", insert -- pursuant to --.

Claim 1, column 7, line 26, delete "directly" and insert -- directing --.

Claim 1, column 7, line 51, delete "a" and insert -- x --.

Claim 6, column 8, line 31, delete "step" and insert -- steps --.

Claim 6, column 8, line 54, after "the", second occurrence, insert -- surface as the laser and detector move along the length of the --.

Claim 13, column 10, line 62, after "deflector", insert -- , --.

Claim 16, column 12, line 11, after "per", insert -- second. --

Signed and Sealed this

Second Day of February, 1988

Attest:

DONALD J. QUIGG

Attesting Officer

Commissioner of Patents and Trademarks